United States Patent [19]

Wollermann

[11] 4,356,609
[45] Nov. 2, 1982

[54] SPINDLE KEYLOCK

[75] Inventor: Kenneth A. Wollermann, Dousman, Wis.

[73] Assignee: Kearney & Trecker Corporation, Milwaukee, Wis.

[21] Appl. No.: 215,911

[22] Filed: Dec. 12, 1980

[51] Int. Cl.³ .............................................. B23Q 5/20
[52] U.S. Cl. .................................. 29/48.5 R; 29/568; 409/231
[58] Field of Search ................ 29/568, 48.5 R, 26 R; 409/231, 232, 233; 74/813 L

[56] References Cited

U.S. PATENT DOCUMENTS

| | | | |
|---|---|---|---|
| 3,135,980 | 6/1964 | Swanson et al. | 10/129 |
| 3,581,562 | 12/1974 | Tomita et al. | 409/231 |
| 3,604,083 | 9/1971 | Antonietto et al. | 29/26 |
| 3,683,490 | 4/1972 | Chabrier | 29/568 |
| 3,691,899 | 9/1972 | Antonietto | 409/232 |
| 3,704,510 | 12/1972 | Sedgwick et al. | 29/568 |
| 3,709,623 | 1/1973 | Stephan et al. | 408/22 |
| 3,779,110 | 12/1973 | Harman et al. | 82/2.5 |
| 3,824,891 | 7/1974 | Carroll | 409/231 |
| 3,874,071 | 4/1975 | Kato | 29/568 |
| 3,893,371 | 7/1975 | Frazier | 409/231 X |
| 3,994,061 | 11/1976 | Tomita et al. | 29/568 |
| 4,019,246 | 4/1977 | Tomita et al. | 29/568 |
| 4,051,583 | 10/1977 | Kato et al. | 29/40 |
| 4,075,927 | 2/1978 | Frazier | 409/233 |
| 4,091,526 | 5/1978 | Nakaso | 29/568 |
| 4,102,035 | 7/1978 | Voglrieder et al. | 29/568 |
| 4,103,405 | 8/1978 | Blum | 29/26 |
| 4,173,817 | 3/1978 | Voglrieder et al. | 29/568 |
| 4,220,430 | 9/1980 | Meiser | 409/231 |

FOREIGN PATENT DOCUMENTS

| | | | |
|---|---|---|---|
| 197710 | 10/1977 | U.S.S.R. | 409/231 |
| 657956 | 4/1979 | U.S.S.R. | 409/231 |

*Primary Examiner*—William R. Briggs
*Attorney, Agent, or Firm*—Cyril M. Hajewski

[57] ABSTRACT

A spindle keylock for stopping and locking the spindle of a machine tool at a predetermined angular orientation to align the machine tool spindle key with the toolholder key to facilitate tool exchange includes a collar fastened about the spindle for co-joint rotation therewith. The collar has a helically cammed exterior surface into which an axially extending slot or channel is inscribed. A cam follower, pivotally mounted to the machine tool spindlehead so as to lie within a plane passing through the spindle axis which is at a predetermined angular orientation with respect to a reference plane passing through the spindle axis in alignment with the spindle key, is rotatable about an axis perpendicular to the axis of the spindle for engaging with the cammed collar surface. When the cam follower is urged by a solenoid or an air cylinder against the cammed collar surface, the cam follower follows the cammed collar surface until the cam follower engages the collar slot to stop and lock the spindle at the desired angular orientation.

6 Claims, 4 Drawing Figures

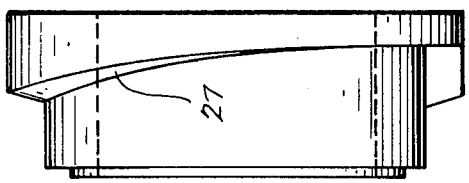
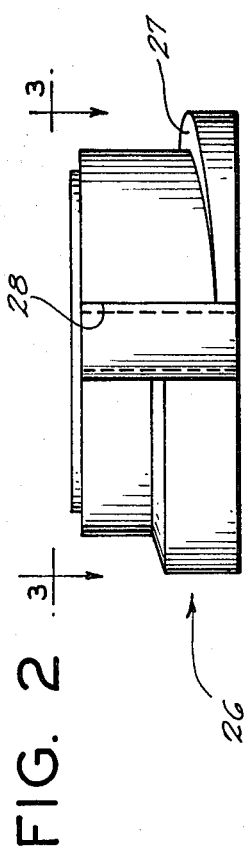

SPINDLE KEYLOCK

BACKGROUND OF THE INVENTION

This invention relates generally to machine tools having rotatable, toolholding spindles, and more specifically, to a spindle keylock for stopping and locking the spindle of a machine tool at a predetermined angular orientation with respect to a fixed plane passing through the spindle axis.

In the operation of horizontal spindle and vertical spindle machine tools, particularly those having automatic tool changers thereon, it is usually necessary to stop and lock the machine tool spindle at a predetermined angular position so that the machine tool spindle key is aligned with the toolholder key. Unless the toolholder key is aligned with the spindle key, the toolholder will not firmly engage the spindle, thereby preventing complete transmission of torque from the spindle to the toolholder.

Heretofore, various devices have been proposed to stop and lock the spindle of a machine tool at a predetermined angular orientation to assure alignment of the toolholder key with the spindle key. Sedgwick et al in U.S. Pat. No. 3,704,510 issued on Dec. 5, 1972 discloses a servo control system which utilizes a position synchro to control spindle drive motor excitation so that spindle rotation ceases and a braking force is applied to the spindle to locate the spindle at a predetermined angular orientation, thereby assuring that the spindle key aligns with a complementary toolholder key. A somewhat different servo control system is described in U.S. Pat. No. 3,874,071 issued Apr. 1, 1975 to Kato. A pair of synchro generators, one for measuring the angular toolholder position and the other for measuring the angular spindle position, are coupled to a control system which controls the rotation of a socket in the arm which transfers tools between the tool storage drum and the tool transfer arm. The control system forces the socket in the arm to rotate in accordance with the difference between output signals of the synchro generators so that the key of the toolholder carried by the arm will, when transferred by tool transfer arm from the socket to the spindle, be aligned with the spindle key. The Sedgwick and Kato servo controlled spindle keylock apparatus are believed subject to the disadvantage that they result in increased machine complexity and cost.

In the past, mechanical clamping means have also been employed for stopping and locking the spindle of a machine tool in a predetermined angular orientation. Harman et al in U.S. Pat. No. 3,779,110 issued on Dec. 18, 1973 and Chabrier, in U.S. Pat. No. 3,683,490 issued on Aug. 15, 1972 describe a spindle keylock apparatus consisting essentially of a pin actuated by a piston for engaging a passage in a gear member or the like rotating co-jointly with the machine tool spindle. Although the Harman and Chabrier spindle locking apparatus are each operative to lock the spindle once the spindle reaches the predetermined angular orientation, neither device provides any means for sensing when the spindle reaches the predetermined angular orientation. Without such means, the Harman and Chabrier spindle lock devices may not always be operative to lock the spindle in the predetermined angular orientation.

To overcome the alleged disadvantage of the Chabrier and Harman apparatus, proximity switches have been employed to sense spindle position. Stephan et al in U.S. Pat. No. 3,709,623 issued on Jan. 9, 1973 describes a spindle keylock arrangement comprising a vee-shaped block attached to the spindle and a roller, the roller being urged by a solenoid, energized through a proximity switch, to engage the vee-shaped block to stop the spindle at the predetermined angular position. Another spindle keylock apparatus utilizing proximity switches is described in each of U.S. Pat. Nos. 3,994,061 and 4,019,246 issued to Tomita on Apr. 30, 1976 and Apr. 26, 1977, respectively, and U.S. Pat. No. 4,091,526 issued to Nakaso on Apr. 30, 1978. The spindle keylock apparatus described in each of the above-identified patents includes a pair of pivotally mounted claws which are urged by a solenoid or the like energized through a proximity switch to engage a dog that extends radially from the spindle. The above-described spindle keylock apparatus are each believed subject to the disadvantage that machine tool wear and vibration will likely cause proximity switch misalignment which may result in locking and stopping of the spindle at a position other than the predetermined angular position.

Other mechanical spindle keylocking apparatus includes the spindle keylock apparatus described by Antonietto et al in U.S. Pat. No. 3,604,803 issued on Sept. 14, 1971 and U.S. Pat. No. 3,691,899 issued on Sept. 19, 1972. The Antonietto spindle keylock apparatus comprises a double helical cam which is urged by an actuator against a cam follower carried by a sleeve keyed to a shaft coupled by a set of gears to the spindle. As the cam engages the cam follower, the sleeve, the shaft, and hence, the spindle, all rotate until the cam follower reaches the top of a cam, at which time the spindle will have reached its predetermined angular position. The Antonietto spindle locking apparatus is believed to suffer from the following disadvantage. Since the cam follower is carried on a sleeve keyed to a shaft coupled by gears to the spindle rather than being carried by the spindle itself, the spindle may not always be positioned in a precise angular orientation due to play between the cam follower and the spindle. Kato et al in U.S. Pat. No. 4,051,583 issued on Oct. 4, 1977 describes a spindle locking device apparatus which, like the Antonietto spindle lock apparatus operates on a shaft coupled by gears to the spindle rather than on the spindle itself and is thus believed to suffer from the same disadvantage as the Antonietto spindle lock apparatus.

Prior art spindle locking apparatus internal to the spindle for stopping and locking the spindle at a predetermined angular orientation without the need for proximity switches or servo controls are disclosed in U.S. Pat. No. 3,851,562 issued to Tomita on Dec. 3, 1974; U.S. Pat. No. 3,135,980 issued to Swanson et al on June 9, 1974 and U.S. Pat. No. 4,075,927 issued to Frazier on Feb. 28. 1978. While each of the internal spindle locking apparatus described in the above-identified patents overcomes many of the disadvantages attributable to other previously described spindle keylocks, the internally mounted spindle keylock apparatus are subject to the drawback that they may not be readily retrofitted to an existing spindle.

In contrast, the present invention concerns a spindle keylock apparatus for stopping and locking the spindle of a machine tool at precise angular orientation without the disadvantages and drawbacks attributable to other prior art devices.

It is an object of the present invention to provide a simple, inexpensive apparatus for stopping and locking the spindle or a machine tool at a predetermined angular orientation.

It is yet another object of the present invention to provide a spindle keylocking device for stopping and locking the spindle at a predetermined angular orientation which may be retrofitted to a pre-existing machine tool spindle.

BRIEF SUMMARY OF THE INVENTION

Briefly, in accordance with the present invention, an apparatus for stopping and locking the spindle of a machine tool at a predetermined angular orientation includes an annular collar fastened about the machine tool spindle for co-joint rotation therewith. The collar is provided with a helically cammed exterior surface into which an axially extending slot or channel is inscribed. A cam follower, in the form of a key, is pivotally mounted to the machine tool spindlehead so as to lie within a plane passing through the spindle axis which is at a predetermined angular orientation with respect to a fixed reference plane passing through the spindle axis in alignment with the spindle key. The cam follower is pivotal about an axis perpendicular to the axis of spindle rotation for engaging the cammed collar surface. When urged by a solenoid or air cylinder against the cammed collar surface, the cam follower rides on the cammed collar surface until it engages the axially extending slot inscribed in the collar surface. Once the cam follower engages the slot inscribed in the cammed collar surface, the spindle is stopped and locked at the desired angular orientation.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 2 is a front view of the collar illustrated in FIG. 3;

FIG. 3 is a top view of a cammed collar comprising a portion of the spindle keylock apparatus of FIG. 1; and FIG. 4 is a side view of the collar of FIG. 2.

DETAILED DESCRIPTION OF THE PREFERRED EMBODIMENT

Figure 1:
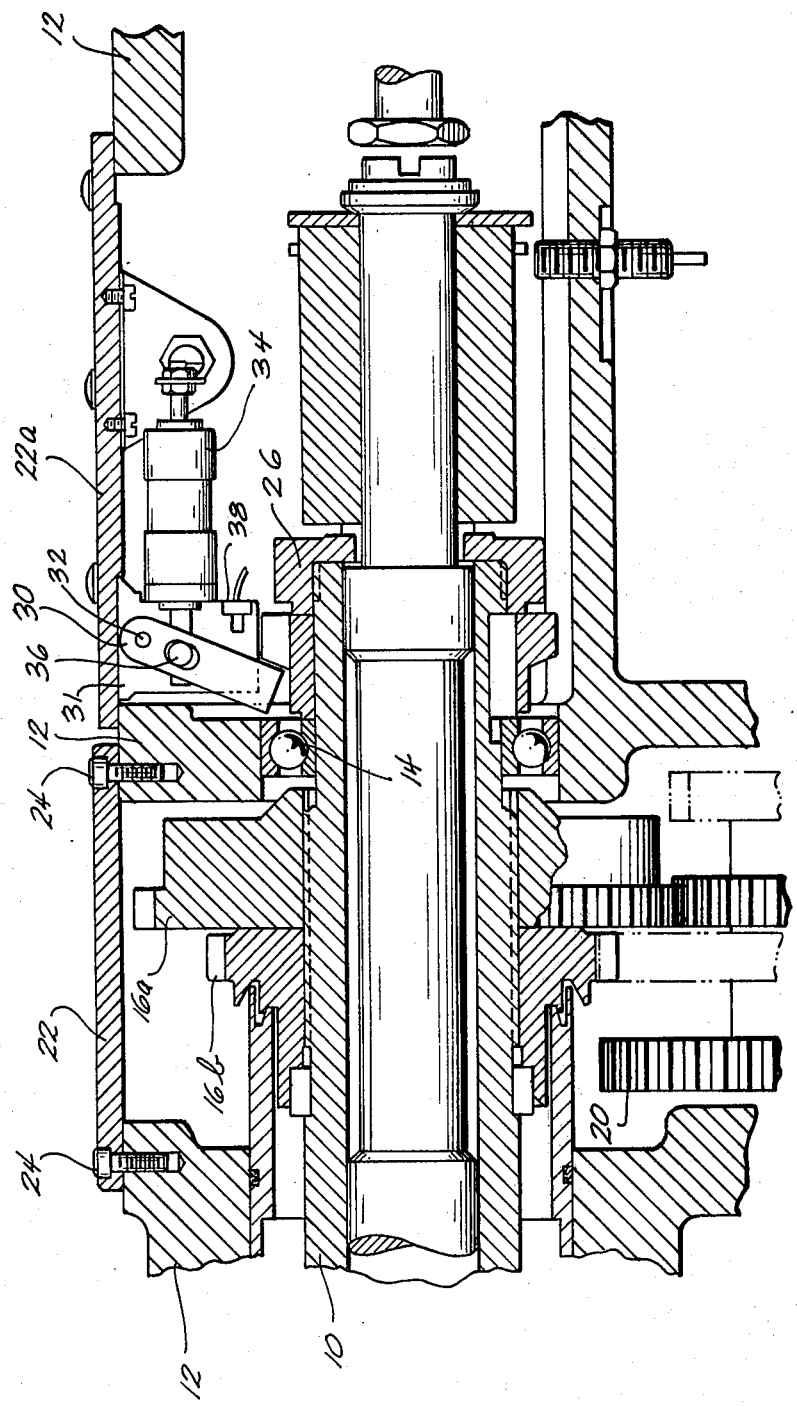
FIG. 1 is a partial cut-away view of the spindle of a machine tool illustrating the spindle keylock apparatus of the present invention.

FIG. 1 illustrates a partial, cut-away view of a machine tool comprising a tool carrying spindle 10 which is journaled for rotation to a spindlehead 12 by bearings 14. A pair of gears 16a and 16b are keyed to spindle 10 for co-joint rotation therewith. Gears 16a and 16b are driven by a motor (not shown) through a cluster gear 20 which has a pair of gear members 20a and 20b, each dimensioned to meshingly engage a respective one of gears 16a and 16b on spindle 10. Cluster gear 20 is slidably mounted for transverse movement along an axis parallel to the axis of spindle 10 between a first position where gear member 20a meshes with gear 16a and a second position where gear member 20b meshes with gear 16b. Thus by shifting cluster gear 20, a change in spindle speed is effectuated.

In practice, spindlehead 12 comprises a frame having a set of passages therein to permit access inside the spindlehead. A set of access plates 22a and 22b are fastened to spindlehead 12 by bolts 24 to overlie the spindlehead access passages so as to prevent entry of foreign matter into the spindlehead.

During machine tool operation, it is usually necessary to stop and lock spindle 10 in a predetermined angular orientation so that the spindle key (not shown) aligns with the key of the toolholder (not shown) being inserted into the spindle. To stop and lock spindle 10 at the predetermined angular orientation, an annular collar 26 is carried on spindle 10 for co-joint rotation therewith. As best illustrated in FIGS. 2, 3 and 4, collar 26 has a helically cammed exterior surface 27 into which an axially extending slot 28 or channel is inscribed, slot 28 being best illustrated in FIGS. 2 and 3. Since collar 26 and spindle 10 rotate co-jointly, the spindle key (not shwon) is always at a fixed angular orientation with respect to slot 28. Although collar 26 is illustrated in FIGS. 2-4 as being comprised of a single member formed either by casting or forging, in certain instances, it may be desirable to configure collar 26 of two or more geometric sections fastened together by bolts or the like.

Referring back to FIG. 1, a cam follower 30, taking the form of a key or the like is pivotally mounted to a block 31 by a pin 32 so as to be rotatable about an axis perpendicular to spindle 10. Block 31 is mounted to access plate 22a such that key 30 lies in a plane which is at a predetermined angular orientation with a fixed plane passing through the spindle axis in alignment with the spindle key.

An actuator 34, typically comprised of a solenoid or an air cylinder, is fastened to access plate 22a. The spindle or arm of actuator 34 is connected to key 30 by means of a pin 36, so that when actuator 34 is actuated by the machine tool control system (not shown) which causes the actuator spindle to be drawn into the actuator, key 30 is urged against the cammed surface of collar 26.

To stop and lock spindle 10 in a predetermined angular orientation, the motor driving cluster gear 20 is caused to rotate spindle 10 very slowly under control of the machine tool control system. As the spindle rotates, actuator 32 is actuated to urge key 30 against the cammed surface of collar 26, causing the key to ride on the cammed collar surface until it engages the axially extending slot inscribed in the collar surface to stop and lock the spindle. When key 30 fully engages the axially extending collar slot, it bears against a proximity switch 38 connected to the machine tool control system, causing the motor driving cluster gear 20 to be de-energized. Since key 30 is at a predetermined angular orientation with respect to the fixed reference plane passing through the spindle in alignment with the spindle key, key 30, will, when it engages slot 28, always stop and lock the spindle at the predetermined angular orientation regardless of where key 30 initially engages the cammed collar surface since the cammed collar surface always steers key 30 right into slot 28.

The foregoing describes a simple spindle keylock apparatus, comprised of a cammed collar surrounding the spindle and a cam follower which is urged by an actuator against the cammed surface to stop and lock the collar and hence the spindle in a predetermined angular orientation. Because of its simple construction, the spindle keylock apparatus of the present invention may be retrofitted to existing spindles.

Although the illustrative embodiment of the invention has been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims.

The principles of this invention having now been fully explained in connection with the foregoing, I hereby claim as my invention:

1. For use with a machine tool having a spindlehead into which a rotatably driven tool carrying a spindle is journaled, apparatus for stopping and locking the spindle at a predetermined angular orientation with respect to a fixed plane passing through the spindle axis in alignment with the spindle key comprising:

a collar fastened about said spindle for co-joint rotation therewith, said collar having an exterior cammed surface in which is inscribed an axially extending slot;

cam follower means pivotally mounted to the machine tool spindlehead and lying within a plane passing through the spindle axis which is at a predetermined angular orientation with respect to said fixed plane, said cam follower means being rotatable about an axis perpendicular to the axis of the spindle for following the cammed surface on said collar; and actuating means fastened to said spindlehead and coupled to said cam follower means for urging said cam follower means against the cammed surface of said collar so that said cam follower means will follow the cammed surface of said collar and engage the slot in said collar to stop and lock the spindle in the predetermined angular orientation.

2. The invention according to claim 1 wherein said cam follower means comprises a key pinned to a block which is fastened to said spindlehead.

3. The invention according to claim 1 wherein said actuating means comprises a solenoid.

4. The invention according to claim 1 wherein said actuating means comprises an air cylinder.

5. The invention according to claim 1 wherein the cammed surface on said collar is helically cammed.

6. The invention according to claim 1 wherein said cammed collar is formed of a single unitary member.

* * * * *